(12) United States Patent
Oono et al.

(10) Patent No.: US 12,394,794 B2
(45) Date of Patent: Aug. 19, 2025

(54) POSITIVE ELECTRODE ACTIVE MATERIAL, HIGH-TEMPERATURE OPERATION TYPE LITHIUM-ION POLYMER SECONDARY BATTERY, HIGH-TEMPERATURE OPERATION TYPE LITHIUM ION INORGANIC ALL-SOLID-STATE SECONDARY BATTERY

(71) Applicant: Sumitomo Metal Mining Co., Ltd., Tokyo (JP)

(72) Inventors: Kouji Oono, Narashino (JP); Satoru Oshitari, Funabashi (JP); Shinichi Tanaka, Sakura (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 0 days.

(21) Appl. No.: 17/706,231

(22) Filed: Mar. 28, 2022

(65) Prior Publication Data

US 2023/0077307 A1    Mar. 9, 2023

(30) Foreign Application Priority Data

Aug. 30, 2021 (JP) ................................. 2021-140347

(51) Int. Cl.
| | |
|---|---|
| H01M 4/38 | (2006.01) |
| H01M 4/02 | (2006.01) |
| H01M 4/48 | (2010.01) |
| H01M 4/50 | (2010.01) |
| H01M 4/52 | (2010.01) |
| H01M 4/62 | (2006.01) |
| H01M 10/0525 | (2010.01) |
| H01M 10/0562 | (2010.01) |
| H01M 10/0565 | (2010.01) |

(52) U.S. Cl.
CPC ............. *H01M 4/62* (2013.01); *H01M 4/382* (2013.01); *H01M 4/483* (2013.01); *H01M 4/502* (2013.01); *H01M 4/523* (2013.01); *H01M 10/0525* (2013.01); *H01M 10/0562* (2013.01); *H01M 10/0565* (2013.01); *H01M 2004/021* (2013.01); *H01M 2300/0068* (2013.01); *H01M 2300/0077* (2013.01); *H01M 2300/0082* (2013.01)

(58) Field of Classification Search
None
See application file for complete search history.

(56) References Cited

U.S. PATENT DOCUMENTS

| | | | | | |
|---|---|---|---|---|---|
| 4,701,301 | A | * | 10/1987 | Kuwahara | C22C 1/1078 |
| | | | | | 427/591 |
| 5,601,947 | A | * | 2/1997 | Skotheim | H01M 10/0565 |
| | | | | | 429/213 |
| 2004/0197549 | A1 | * | 10/2004 | Inokuma | H01J 29/868 |
| | | | | | 428/323 |
| 2007/0048619 | A1 | | 3/2007 | Inda | |
| 2009/0042102 | A1 | * | 2/2009 | Cui | H01M 10/052 |
| | | | | | 429/231.95 |
| 2011/0049745 | A1 | * | 3/2011 | Katayama | H01M 10/0585 |
| | | | | | 264/104 |
| 2011/0053001 | A1 | * | 3/2011 | Babic | C04B 35/624 |
| | | | | | 429/322 |
| 2016/0079597 | A1 | * | 3/2016 | Fujiki | H01M 10/0525 |
| | | | | | 429/304 |
| 2017/0222258 | A1 | | 8/2017 | Kataoka et al. | |
| 2020/0235388 | A1 | | 7/2020 | Xia et al. | |
| 2021/0408545 | A1 | | 12/2021 | Maeda et al. | |

FOREIGN PATENT DOCUMENTS

| | | | |
|---|---|---|---|
| CN | 103840207 A | | 6/2014 |
| CN | 109950528 A | | 6/2019 |
| EP | 3893308 A1 | | 10/2021 |
| JP | H05-315007 A | * | 11/1993 |
| JP | 2001-217095 | * | 8/2001 |
| JP | 2008-204777 A | | 9/2008 |
| JP | 2009-016234 | * | 1/2009 |
| JP | 2009181901 A | * | 8/2009 |
| KR | 10-2015-0011552 | * | 2/2015 |
| WO | WO 2011/058981 | * | 6/2011 |
| WO | WO 2014/170998 | * | 10/2014 |
| WO | 2019/243614 A1 | | 12/2019 |

OTHER PUBLICATIONS

Machine translation of JP 2009-016234, published on Jan. 22, 2009 (Year: 2009).*
Machine translation of WO 2011/058981, published on May 19, 2011 (Year: 2011).*
Machine translation of KR 10-2015-0011552, published on Feb. 2, 2015 (Year: 2015).*
Machine translation of JP 2001-217095, published on Aug. 10, 2001 (Year: 2001).*
Machine translation of JP 2009-181901 A, published on Aug. 13, 2009 (Year: 2009).*
Machine translation of JP H05-315007A, published on Nov. 26, 1993 (Year: 1993).*
Machine translation of WO2014/170998, published on Oct. 23, 2014 (Year: 2014).*
D. Larcher et al., "Effect of Particle Size on Lithium Intercalation into $\alpha$-Fe2O3", Journal of The Electrochemical Society, 150(1): A133-139 (2003).
H. Kitaura et al., "Mechanochemical synthesis of $\alpha$-Fe2O3 nanoparticles and their application to all-solid-state lithium batteries", Journal of Power Sources 183: 418-421 (2008).

(Continued)

*Primary Examiner* — Anca Eoff
(74) *Attorney, Agent, or Firm* — Merchant & Gould P.C.; Daniel Pereira

(57) ABSTRACT

A positive electrode active material that is used in a high-temperature operation type lithium ion solid secondary battery, wherein the positive electrode active material is made of oxide particles, which contains a first transition element and does not include an alkali metal.

6 Claims, No Drawings

(56) References Cited

OTHER PUBLICATIONS

H. Kitaura et al., "Preparation of α-Fe2O3 Electrode Materials via Solution Process and Their Electrochemical Properties in All-Solid-State Lithium Batteries", Journal of The Electrochemical Society, 154(7): A725-729 (2007).
I. Aldalur et al., "Flowable polymer electrolytes for lithium metal batteries", Journal of Power Sources 423: 218-226 (2019).
Search Report for European Patent Application No. 22164394.3 (Sep. 20, 2022).
Official communication and Examination Search Report for Canadian Patent Application No. 3153532 (Mar. 2, 2023).
Bui Thi Hang et al., "Electrochemical properties of Fe2O3 microparticles and their application in Fe/air battery anodes", Journal of Alloys and Compounds, 655: 44-49 (2016).
Hang Su et al., "Hierarchical Mn2O3 Hollow Microspheres as Anode Material of Lithium Ion Battery and Its Conversion Reaction Mechanism Investigated by Xanes", Applied Materials & Interfaces, 7: 8488-8494 (2015).
Communication pursuant to Article 94(3) EPC, issued in European Patent Application 22164394.3 (Nov. 6, 2023).
Communication issued in Canadian Patent Application No. 3,153,532 (Jun. 25, 2024).

\* cited by examiner

POSITIVE ELECTRODE ACTIVE MATERIAL, HIGH-TEMPERATURE OPERATION TYPE LITHIUM-ION POLYMER SECONDARY BATTERY, HIGH-TEMPERATURE OPERATION TYPE LITHIUM ION INORGANIC ALL-SOLID-STATE SECONDARY BATTERY

CROSS-REFERENCE TO RELATED APPLICATIONS

This application claims benefit of and priority to Japanese Patent Application No. 2021-140347, filed on Aug. 30, 2021, which is incorporated by reference herein in its entirety.

TECHNICAL FIELD

The present invention relates to a positive electrode active material, a high-temperature operation type lithium-ion polymer secondary battery and a high-temperature operation type lithium ion inorganic all-solid-state secondary battery. Lithium-ion polymer secondary batteries for which a polymer electrolyte is used as an electrolyte and lithium ion inorganic all-solid-state secondary batteries for which an inorganic solid electrolyte is used will be simply referred to as lithium ion solid secondary batteries in some cases.

BACKGROUND ART

In recent years, as batteries from which size reduction, weight reduction and an increase in capacity are anticipated, non-aqueous liquid-electrolyte-based secondary batteries such as lithium-ion secondary batteries have been proposed and put into practical use. A lithium-ion secondary battery is made up of a positive electrode and a negative electrode having properties capable of reversibly intercalating and deintercalating lithium ions and a non-aqueous electrolyte.

As a negative electrode active material of a negative electrode material of the lithium-ion secondary battery, generally, a carbon-based material, a metal material such as Si or Sn having properties capable of reversibly intercalating and deintercalating lithium ions, or a Li-containing metal oxide is used. Examples of such a Li-containing metal oxide include lithium titanate ($Li_4Ti_5O_{12}$)

On the other hand, as the positive electrode of the lithium-ion secondary battery, a positive electrode material mixture containing a positive electrode material, a binder and the like is in use. As a positive electrode active material, a Li-containing metal oxide having properties capable of reversibly intercalating and deintercalating lithium ions such as layered oxide-based lithium cobalt oxide (LCO), ternary layered oxide (NCM) in which a part of cobalt is substituted with manganese and nickel, or spinel manganese lithium (LMO), which is a lithium manganate compound, lithium iron oxide (LFP), or lithium iron manganese phosphate (LFMP) is used. In addition, this positive electrode material mixture is applied to the surface of a metal foil, which is called an electrode current collector, whereby the positive electrode of the lithium-ion secondary battery is formed. It has been requested to furthermore reduce the cost of materials of the positive electrode materials.

As the liquid electrolyte in the lithium-ion secondary battery, a non-aqueous solvent is used. As the non-aqueous solvent, it is possible to apply a positive electrode active material that oxidizes and reduces at a high potential or a negative electrode active material that oxidizes and reduces at a low potential. This makes it possible to realize a lithium-ion secondary battery having a high voltage.

Such a lithium-ion secondary battery is lightweight and small and has high energy compared with conventional secondary batteries such as a lead battery, a nickel-cadmium battery, and a nickel metal hydride secondary battery. Therefore, lithium-ion secondary batteries are used not only as a small power source that is used for portable electronic devices such as mobile phones and notebook personal computers, but also as a large stationary emergency power source.

In recent years, there has been a demand for improvement in the performance of lithium-ion secondary batteries, and a variety of studies have been underway regarding performance improvement. For example, in order to further improve the safety of lithium-ion secondary batteries, studies are underway regarding all-solid-state batteries in which a flammable organic solvent is not used as the electrolyte and a non-volatile polymer electrolyte film or an inorganic solid electrolyte is used, batteries in which an ionic liquid is used, and the like. Among them, lithium-ion polymer secondary batteries in which a polymer electrolyte film is used are being actively studied since it is possible to apply a manufacturing process by coating in the same manner as to batteries in which a conventional liquid electrolyte is used, the prices are inexpensive, the conductivity of the polymer electrolyte film is high, and thickness reduction is easy. Furthermore, since the polymer electrolyte film is in a dense solid state, in the polymer electrolyte film, the formation of needle-like metal crystals called dendrites is suppressed. Therefore, in lithium-ion polymer secondary batteries, it is possible to use lithium metal negative electrodes without impairing safety, and thus significant improvement in capacity can be expected.

As a positive electrode active material for lithium ion batteries in which a lithium metal negative electrode is used, for example, a positive electrode active material made of ultrafine iron oxide particles having an average particle diameter within a range of 1 to 10 nm and a particle diameter distribution width within a range of 1 to 10 nm is known (for example, refer to Patent Document 1).

RELATED ART DOCUMENT

Patent Document

[Patent Document 1] Japanese Laid-open Patent Publication No. 2008-204777

DISCLOSURE OF THE INVENTION

Problem that the Invention is to Solve

It is known that iron oxide operates as a positive electrode active material when made into fine particles. However, in the case of producing a positive electrode containing fine iron oxide particles as a positive electrode active material, since a large amount of a binder or a conductive auxiliary agent is required, there has been a problem in that the battery capacity does not increase. Since positive electrode active materials made of iron oxide do not contain lithium, there is a need to use metallic lithium or the like in negative electrodes, dendrites are formed, and there is a problem with safety.

Means for Solving the Problem

As a result of intensive studies, the inventors found that, even when low-cost oxide particles which do not include high cost alkali metal are used, sufficient battery performance can be achieved without the generation of dendrites, by using secondary batteries which include a dense solid electrolyte and are operated at a high temperature. The inventors also found that non-ultrafine oxide particles are preferably used in such secondary batteries.

The present inventors found that, in secondary batteries in which a dense solid electrolyte is used such as lithium-ion polymer secondary batteries or inorganic all-solid-state batteries, a configuration of a lithium secondary battery including a negative electrode containing lithium with no concern of safety attributed to the formation of dendrites becomes possible, and, when operated at a high temperature, a non-alkali metal-containing active material is capable of operating in a non-ultrafine particle form, which eliminates a necessity of adding a large amount of a binder or a conductive auxiliary agent and completed the present invention.

The present invention provide a positive electrode active material described below.

That is, the first aspect of the present invention provides a positive electrode active material that is used in a high-temperature operation type lithium ion solid secondary battery and is made of oxide particles, which contains a first transition element and does not include an alkali metal.

The positive electrode active material of the first aspect preferably has the following characteristics. In addition, two or more of the following characteristics can be preferably combined.

In the positive electrode active material of the present invention, an operating temperature of the high-temperature operation type lithium ion solid secondary battery is preferably 40° C. or higher and 300° C. or lower.

In the positive electrode active material of the present invention, the high-temperature operation type lithium ion solid secondary battery preferably includes a positive electrode which includes the positive electrode active material, a negative electrode containing lithium and a polymer electrolyte or an inorganic solid electrolyte as an electrolyte.

In the positive electrode active material of the present invention, the oxide particles are preferably made of a compound represented by a general formula $M_yO_z$ (where M is at least one selected from the group consisting of Sc, Ti, V, Cr, Mn, Fe, Co, Ni, and Cu, $1 \leq y \leq 3$, and $1 \leq z \leq 4$).

In the positive electrode active material of the present invention, an average particle diameter of the oxide particles is preferably 30 nm or more and 50 μm or less.

The present invention provides a high-temperature operation type lithium-ion polymer secondary battery and a high-temperature operation type lithium ion inorganic all-solid-state secondary battery described below. That is, the second aspect of the present invention provides a high-temperature operation type lithium-ion polymer secondary battery which includes a positive electrode containing a positive electrode active material made of oxide particles which contains a first transition element and does not contain an alkali metal, a negative electrode containing lithium, and an ion conductive polymer electrolyte which is located between the positive electrode and the negative electrode.

The third aspect of the present invention provides a high-temperature operation type lithium ion inorganic all-solid-state secondary battery which includes a positive electrode containing a positive electrode active material made of oxide particles which contains a first transition element and does not contain an alkali metal, a negative electrode containing lithium, and an inorganic solid electrolyte which is located between the positive electrode and the negative electrode.

It is preferable that the high-temperature operation type lithium-ion polymer secondary battery and the high-temperature operation type lithium ion inorganic all-solid-state secondary battery include the positive electrode active material of the first aspect. Preferable characteristics of the first aspect described above and the combination thereof are also preferable in the second and the third aspect.

Advantage of the Invention

According to the positive electrode active material of the present invention, it is possible to produce an all-solid-state lithium-ion secondary battery in which a configuration of a lithium ion all-solid-state secondary battery including a negative electrode containing lithium with no concern of safety attributed to the formation of dendrites becomes possible, and, when operated at a high temperature, a non-alkali metal-containing active material is capable of operating in a non-ultrafine particle form, which eliminates a necessity of adding a large amount of a binder or a conductive auxiliary agent.

According to the high-temperature operation type lithium-ion polymer secondary battery of the present invention, it is possible to provide a lithium-ion polymer secondary battery in which a configuration of a lithium ion all-solid-state secondary battery including a negative electrode containing lithium with no concern of safety attributed to the formation of dendrites becomes possible, and, when operated at a high temperature, a non-alkali metal-containing active material is capable of acting in a non-ultrafine particle form, which eliminates a necessity of adding a large amount of a binder or a conductive auxiliary agent.

According to the high-temperature operation type lithium ion inorganic all-solid-state secondary battery of the present invention, it is possible to provide a lithium ion inorganic all-solid-state secondary battery in which a configuration of a lithium ion inorganic all-solid-state secondary battery including a negative electrode containing lithium with no concern of safety attributed to the formation of dendrites becomes possible, and, when operated at a high temperature, a non-alkali metal-containing active material is capable of operating in a non-ultrafine particle form, which eliminates a necessity of adding a large amount of a binder or a conductive auxiliary agent.

BEST MODE FOR CARRYING OUT THE INVENTION

Preferable examples of an embodiment of a positive electrode active material, a high-temperature operation type lithium-ion polymer secondary battery and a high-temperature operation type lithium ion inorganic all-solid-state secondary battery of the present invention will be described.

The present embodiment is simply a specific description for better understanding of the gist of the invention and does not limit the present invention unless particularly otherwise described. For example, unless otherwise restricted, conditions and characteristics such as material, quantity, type, number, kind, size, ratio, and time, combination and the like may be changed, added, or omitted as necessary.

(Positive Electrode Active Material)

A positive electrode active material of the present embodiment is used in high-temperature operation type lithium solid secondary batteries. The positive electrode active material of the present embodiment is made of (non-alkali metal-containing) oxide particles that contain a first transition element and do not need to necessarily contain an alkali metal. That is, the positive electrode active material of the present embodiment does not include alkali metal such as lithium, sodium, potassium, rubidium, caesium and francium. Since the positive electrode active material of the present embodiment does not include alkali metal, there is an advantage in terms of a cost and the like.

Examples of the first transition element include Sc, Ti, V, Cr, Mn, Fe, Co, Ni, and Cu.

The lithium solid secondary battery includes a lithium-ion polymer secondary battery and a lithium ion inorganic all-solid-state secondary battery.

The oxide particles that configure the positive electrode active material of the present embodiment are made of, for example, a compound represented by a general formula $M_yO_z$ (where M is at least one selected from the group consisting of Sc, Ti, V, Cr, Mn, Fe, Co, Ni, and Cu, $1 \leq y \leq 3$, and $1 \leq z \leq 4$). For example, Y may be 1 or more and 3 or less, 1 or more and 2.5 or less, or 1.5 or more and 2 or less. Z may be 1 or more and 4 or less, 1.5 or more and 3.5 or less, or 2 or more and 3 or less.

In a case where the first transition element is scandium (Sc), examples thereof include scandium (III) oxide ($Sc_2O_3$).

In a case where the first transition element is titanium (Ti), examples thereof include titanium (III) oxide ($Ti_2O_3$), titanium (IV) oxide ($TiO_2$), and the like.

In a case where the first transition element is vanadium (V), examples thereof include vanadium (III) oxide ($V_2O_3$), vanadium tetraoxide ($V_2O_4$), vanadium (V) oxide ($V_2O_5$), vanadium dioxide ($VO_2$), and the like.

In a case where the first transition element is chromium (Cr), examples thereof include chromium (III) oxide ($Cr_2O_3$), chromium (IV) oxide ($CrO_2$), and the like.

In a case where the first transition element is manganese (Mn), examples thereof include manganese dioxide ($MnO_2$), trimanganese tetraoxide ($Mn_3O_4$), and the like.

In a case where the first transition element is iron (Fe), examples thereof include iron (III) oxide ($Fe_2O_3$), triiron tetraoxide ($Fe_3O_4$), and the like.

In a case where the first transition element is cobalt (Co), examples thereof include cobalt (III) oxide ($Co_2O_3$), tricobalt tetraoxide ($Co_3O_4$), and the like.

In a case where the first transition element is nickel (Ni), examples thereof include nickel (II) oxide ($Ni_2O_3$), nickel (IV) oxide ($NiO_2$), and the like.

In a case where the first transition element is copper (Cu), examples thereof include copper (I) oxide ($Cu_2O$), copper (II) oxide (CuO), and the like.

Among the above-described oxides, Oxides of Ti, Mn, Fe, and Ni are preferable from the viewpoints of price, abundance of resources, safety, and the like.

As described above, in the positive electrode active material of the present embodiment, non-alkali metal-containing oxide particles represented by the general formula $M_yO_z$ are preferably used. In the positive electrode active material of the present embodiment, a variety of metal elements and non-metal elements may be appropriately used as a dopant for the purpose of improvement in the electron conductivity, stabilization of the structure, and the like.

The lower limit value of the average particle diameter (D50) of the oxide particles is preferably 30 nm or more, more preferably 70 nm or more, still more preferably 200 nm or more, and particularly preferably 0.5 μm or more. In addition, the upper limit value of the average particle diameter of the oxide particles is preferably 50 μm or less, more preferably 30 μm or less, and still more preferably 25 μm or less. For example, the average particle diameter thereof may be 100 nm to 35 μm, 500 nm to 28 μm, 1.0 μm to 25 μm, 1.2 μm to 23 μm, 1.5 μm to 22 μm, 2.0 μm to 21.9 μm, 3.0 μm to 20 μm, 5.0 μm to 15 μm or the like.

When the average particle diameter of the oxide particles is less than the lower limit value, an excess amount of an additive such as a conductive auxiliary agent or a binder is required, and there is a case where the electrode capacity decreases. When the average particle diameter of the oxide particles is the upper limit value or less, it is possible to make the oxide particles favorably operate as an active material.

Here, the average particle diameter of the oxide particles can be measured using a laser diffraction and scattering particle size distribution measurement instrument or the like. The average particle diameter (D50) of the oxide particles may be the particle size when the cumulative volume percentage of the particle size distribution is 50%.

[Method for Manufacturing Positive Electrode Active Material]

A method for manufacturing the positive electrode active material of the present embodiment is not particularly limited. A method by which desired oxide particles can be obtained, such as a wet type method or a dry type method, is appropriately selected.

In addition, wet type carbon coating by thermal decomposition of an organic substance, dry type or semi-dry type carbon compounding in which an attritor or a planetary ball mill and a carbon-based material are used may be performed as necessary.

Similarly, ion conductive polymer coating may be performed on positive electrode active materials for lithium-ion polymer secondary batteries or coating with an inorganic solid electrolyte may be performed on positive electrode active materials for lithium ion inorganic all-solid-state batteries.

[High-Temperature Operation Type Lithium-Ion Polymer Secondary Battery]

A high-temperature operation type lithium-ion polymer secondary battery of the present embodiment includes a positive electrode for a lithium-ion polymer secondary battery containing the positive electrode active material of the present embodiment, a negative electrode containing lithium, and an ion conductive polymer electrolyte present between the positive electrode for a lithium-ion polymer secondary battery and the negative electrode containing lithium.

"Positive Electrode for Lithium-Ion Polymer Secondary Battery"

The positive electrode for a lithium-ion polymer secondary battery includes an electrode current collector made of a metal foil and a positive electrode mixture layer formed on the electrode current collector. The positive electrode mixture layer contains the positive electrode active material of the present embodiment and an ion conductive polymer electrolyte. In addition, the positive electrode mixture layer may contain a conductive auxiliary agent such as carbon black or a binder as necessary. The positive electrode mixture layer may not contain a conductive auxiliary agent such as carbon black and/or a binder as necessary. The ion conductive polymer electrolyte included in the positive electrode mixture layer may be the same with or different from the ion conductive polymer electrolyte present between the positive electrode and the negative electrode.

The content of the positive electrode active material in the positive electrode mixture layer is not particularly limited, but is preferably 50% by mass or more and 95% by mass or less, more preferably 55% by mass or more and 90% by mass or less, still more preferably 60% by mass or more and 90% by mass or less, furthermore preferably 60% by mass or more and 80% by mass or less, and particularly preferably 60% by mass or more and 70% by mass or less, for example, in a case where the total mass of the positive electrode mixture layer is set to 100% by mass. When the content of the positive electrode active material is less than the above-described lower limit value, the capacity of the lithium-ion polymer secondary battery including the positive electrode for a lithium-ion polymer secondary battery containing the positive electrode active material decreases. When the content of the positive electrode active material exceeds the above-described upper limit value, since it is not possible for ions or electrons to sufficiently reach the surface of the active material, the capacity of the lithium-ion polymer secondary battery including the positive electrode for a lithium-ion polymer secondary battery containing the positive electrode active material decreases.

"Ion Conductive Polymer Electrolyte"

As the ion conductive polymer electrolyte, a variety of ion conductive polymer electrolytes such as a polyethylene oxide, modified polyethylene oxide, and polyvinylidene fluoride which contain a Li electrolyte such as lithium perchlorate, lithium hexafluorophosphate, or Li bis(trifluoromethanesulfonyl)imide (LiTFSI) are widely known and can be appropriately used.

There is a need to contain the ion conductive polymer electrolyte, which is an electrolyte, in the positive electrode mixture layer, and the content of the ion conductive polymer electrolyte in the positive electrode mixture layer is not particularly limited, but is preferably 5% by mass or more and 50% by mass or less, more preferably 10% by mass or more and 40% by mass or less, still more preferably 15% by mass or more and 40% by mass or less, furthermore preferably 20% by mass or more and 40% by mass or less, and particularly preferably 30% by mass or more and 40% by mass or less, for example, in a case where the total mass of the positive electrode mixture layer is set to 100% by mass. When the content of the ion conductive polymer electrolyte is the above-described lower limit value or more, an ion conductive path is sufficiently formed on the surface of the positive electrode active material, there is no case where an active material that does not contribute to reactions is generated, and a decrease in the battery capacity can be suppressed. When the content of the ion conductive polymer electrolyte is the above-described upper limit value or less, since there is no case where the ion conductive polymer electrolyte is vainly wasted and, also, there is no case where the proportion of the active material in the electrode becomes too low, a decrease in the battery capacity can be suppressed.

"Binder"

In a case where the ion conductive polymer electrolyte is adhesive, the binder is not always required. The binder may be used or may not be used as needed. As the binder, that is, a binder resin, for example, a polytetrafluoroethylene (PTFE) resin, a polyvinylidene fluoride (PVdF) resin, fluororubber, or the like is preferably used.

The content of the binder in the positive electrode mixture layer is not particularly limited, but is preferably 5.0% by mass or less, more preferably 3.0% by mass or less, and still more preferably 2.0% by mass or less, and particularly preferably 1.5% by mass or less, for example, in a case where the total mass of the positive electrode mixture layer is set to 100% by mass. When the content of the binder is the above-described upper limit value or less, it is possible to sufficiently enhance the binding property between the positive electrode mixture layer and the electrode current collector. This makes it possible to suppress the occurrence of the cracking or dropping of the positive electrode mixture layer during the consolidation or the like of the positive electrode mixture layer. In addition, in charging and discharging processes of the lithium-ion polymer secondary battery, it is possible to suppress the peeling of the positive electrode mixture layer from the electrode current collector, a decrease in the battery capacity, and the degradation of the charge and discharge rate characteristics. When the content of the binder is the above-described upper limit value or less, the internal resistance of a positive electrode material for the lithium ion polymer secondary battery decreases, and a decrease in the battery capacity at high-speed charge and discharge rates can be suppressed.

"Conductive Auxiliary Agent"

The conductive auxiliary agent is not particularly limited, and, for example, at least one conductive auxiliary agent selected from the group consisting of particulate carbon such as acetylene black (AB), Ketjen black, or furnace black, a fibrous carbon such as vapor grown carbon fiber (VGCF) or a carbon nanotube, and graphene is used.

The content of the conductive auxiliary agent in the positive electrode mixture layer is not particularly limited, but is preferably 1.0% by mass or more and 20% by mass or less, more preferably 1.0% by mass or more and 10% by mass or less, furthermore preferably 1.5% by mass or more and 7.0% by mass or less, still more preferably 2.0% by mass or more and 5.0% by mass or less, and particularly preferably 2.5% by mass or more and 4.0% by mass or less, for example, in a case where the total mass of the positive electrode mixture layer is set to 100% by mass. When the content of the conductive auxiliary agent is the above-described lower limit value or more, it is possible to make the lithium-ion polymer secondary battery sufficiently operate. When the content of the conductive auxiliary agent exceeds the upper limit value, not only is the conductive auxiliary agent wasted, but there is also a case where the lack of the binding force brings about the dropping of the positive electrode active material or a decrease in the capacity.

Since the positive electrode of the present embodiment contains the positive electrode active material of the present embodiment, the lithium-ion polymer secondary battery in which the positive electrode of the present embodiment is used is excellent in terms of the battery capacity.

"Method for Manufacturing Positive Electrode for Lithium-Ion Polymer Secondary Battery"

A method for manufacturing the positive electrode for a lithium-ion polymer secondary battery is not particularly limited as long as the positive electrode mixture layer can be formed on at least one main surface of the electrode current collector using the positive electrode active material of the present embodiment in the method. Examples of the method for manufacturing the positive electrode include the following method.

First, the positive electrode active material of the present embodiment, an ion conductive polymer electrolyte, and a solvent are mixed to prepare a positive electrode material paste. At this time, a conductive auxiliary agent such as carbon black and a binder may be added to the positive electrode material paste in the present embodiment as necessary.

"Solvent"

The solvent that is used in the positive electrode material paste containing the positive electrode active material of the present embodiment is appropriately selected depending on the properties of the binder. Appropriate selection of the solvent makes it possible to facilitate the application of the positive electrode material paste to an object to be coated such as the electrode current collector.

Examples of the solvent include water, alcohols, esters, ethers, ketones, amides, glycols and the like.

These solvents may be used singly or two or more solvents may be mixed and used.

The content of the solvent in the positive electrode material paste is preferably as small as possible from the viewpoint of the price, but may be appropriately determined in consideration of the positive electrode formability and the coatability.

A method for mixing the positive electrode active material of the present embodiment, the ion conductive polymer electrolyte, the solvent, if necessary, the conductive auxiliary agent, and the binder is not particularly limited as long as these components can be uniformly mixed by the method. Examples thereof include a mixing method in which the components are mixed using a kneader such as a ball mill, a sand mill, a planetary mixer, a paint shaker, or a homogenizer.

The positive electrode material paste is applied to at least one main surface of the electrode current collector to form a coating, and then the coating is dried, thereby obtaining an electrode current collector having the coating made of the mixture of the positive electrode material and the binder formed on at least one main surface. After that, the coating may be pressurized and pressure-bonded.

"Negative Electrode Containing Lithium"

Examples of the negative electrode which contains lithium include negative electrodes which contains a negative electrode material such as metallic Li, a Li alloy, $Li_4Ti_5O_{12}$, or a Si-based material ($Li_{4.4}Si$).

The high-temperature operation type lithium-ion polymer secondary battery of the present embodiment includes a positive electrode containing the positive electrode active material of the present embodiment as the positive electrode and is thus excellent in terms of the battery capacity. An operating temperature of the high-temperature operation type lithium-ion polymer secondary battery may be 40° C. or higher and 300° C. or lower. The operating temperature thereof can be optionally selected in the range of 40° C. to 300° C., and may be 45° C. or higher and 280° C. or lower, 50° C. or higher and 250° C. or lower, 60° C. or higher and 200° C. or lower, 70° C. or higher and 150° C. or lower, or 80° C. or higher and 130° C. or lower. The recitation of "the high-temperature operation type" may mean that the secondary battery can be suitably and effectively operated (charging/discharging) and/or stored under such a high temperature environment.

[High-Temperature Operation Type Lithium Ion Inorganic all-Solid-State Secondary Battery]

A high-temperature operation type lithium ion inorganic all-solid-state secondary battery of the present embodiment includes a positive electrode for a lithium ion inorganic all-solid-state secondary battery containing the positive electrode active material of the present embodiment, a negative electrode containing lithium, and an inorganic solid electrolyte present between the positive electrode for a lithium ion inorganic all-solid-state secondary battery and the negative electrode containing lithium.

"Positive Electrode for Lithium Ion Inorganic all-Solid-State Secondary Battery"

The positive electrode for a lithium ion inorganic all-solid-state secondary battery includes an electrode current collector made of a metal foil and a positive electrode mixture layer formed on the electrode current collector. The positive electrode mixture layer contains the positive electrode active material of the present embodiment and an inorganic solid electrolyte. In addition, the positive electrode mixture layer may contain a conductive auxiliary agent such as carbon black or a binder as necessary. The inorganic solid electrolyte included in the positive electrode mixture layer may be the same with or different from the inorganic solid electrolyte present between the positive electrode and the negative electrode.

The content of the positive electrode active material in the positive electrode mixture layer is not particularly limited, but is preferably 50% by mass or more and 95% by mass or less, more preferably 55% by mass or more and 90% by mass or less, still more preferably 60% by mass or more and 90% by mass or less, furthermore preferably 60% by mass or more and 80% by mass or less, and particularly preferably 60% by mass or more and 70% by mass or less, for example, in a case where the total mass of the positive electrode mixture layer is set to 100% by mass. When the content of the positive electrode active material is less than the above-described lower limit value, the capacity of the lithium ion inorganic all-solid-state secondary battery including the positive electrode for a lithium ion inorganic all-solid-state secondary battery containing the positive electrode active material decreases. When the content of the positive electrode active material exceeds the above-described upper limit value, since it is not possible for ions or electrons to sufficiently reach the surface of the active material, the capacity of the lithium ion inorganic all-solid-state secondary battery including the positive electrode for a lithium ion inorganic all-solid-state secondary battery containing the positive electrode active material decreases.

"Inorganic Solid Electrolyte"

As the inorganic solid electrolyte, for example, a variety of inorganic solid electrolytes such as an oxide-based inorganic solid electrolyte such as $Li_7La_3Zr_2O_{12}$, a Li—Sn—Si—P—S-based sulfide, Li-metal-hydride type compound, and Li—B-hydride type compound are known and can be appropriately used.

There is a need to contain the inorganic solid electrolyte, which is an electrolyte, in the positive electrode mixture layer, and the content of the inorganic solid electrolyte in the positive electrode mixture layer is not particularly limited, but is preferably 5% by mass or more and 50% by mass or less, more preferably 10% by mass or more and 40% by mass or less, still more preferably 15% by mass or more and 40% by mass or less, furthermore preferably 20% by mass or more and 40% by mass or less, and still more preferably 30% by mass or more and 40% by mass or less, for example, in a case where the total mass of the positive electrode mixture layer is set to 100% by mass. When the content of the inorganic solid electrolyte is the above-described lower limit value or more, an ion conductive path is sufficiently formed on the surface of the positive electrode active material, there is no case where an active material that does not contribute to reactions is generated, and a decrease in the battery capacity can be suppressed. When the content of the inorganic solid electrolyte is the above-described upper limit value or less, since there is no case where the inorganic solid electrolyte is vainly wasted and, also, there is no case where the proportion of the active material in the electrode becomes too low, a decrease in the battery capacity can be suppressed.

"Binder"

In a case where the inorganic solid electrolyte is adhesive, the binder is not always required. The binder may be used as needed. As the binder, that is, a binder resin, for example, a polytetrafluoroethylene (PTFE) resin, a polyvinylidene fluoride (PVdF) resin, fluororubber, or the like is preferably used.

The content of the binder in the positive electrode mixture layer is not particularly limited, but is preferably 5.0% by mass or less, more preferably 3.0% by mass or less, and still more preferably 2.0% by mass or less, and particularly preferably 1.5% by mass or less for example, in a case where the total mass of the positive electrode mixture layer is set to 100% by mass. When the content of the binder is the above-described upper limit value or less, it is possible to sufficiently enhance the binding property between the positive electrode mixture layer and the electrode current collector. This makes it possible to suppress the occurrence of the cracking or dropping of the positive electrode mixture layer during the consolidation or the like of the positive electrode mixture layer. In addition, in charging and discharging processes of the lithium ion inorganic all-solid-state battery, it is possible to suppress the peeling of the positive electrode mixture layer from the electrode current collector, a decrease in the battery capacity, and the degradation of the charge and discharge rate. When the content of the binder is the above-described upper limit value or less, the internal resistance of a positive electrode material for the lithium ion inorganic all-solid-state battery decreases, and a decrease in the battery capacity at high-speed charge and discharge rates can be suppressed.

"Conductive Auxiliary Agent"

The conductive auxiliary agent is not particularly limited, and, for example, at least one conductive auxiliary agent selected from the group consisting of particulate carbon such as acetylene black (AB), Ketjen black, or furnace black, a fibrous carbon such as vapor grown carbon fiber (VGCF) or a carbon nanotube, and graphene is used.

The content of the conductive auxiliary agent in the positive electrode mixture layer is not particularly limited, but is preferably 1.0% by mass or more and 20% by mass or less, more preferably 1.0% by mass or more and 10% by mass or less, furthermore preferably 1.5% by mass or more and 7.0% by mass or less, still more preferably 2.0% by mass or more and 5.0% by mass or less, and particularly preferably 2.5% by mass or more and 4.0% by mass or less, for example, in a case where the total mass of the positive electrode mixture layer is set to 100% by mass. When the content of the conductive auxiliary agent is the above-described lower limit value or more, it is possible to make the lithium ion inorganic all-solid-state battery sufficiently operate. When the content of the conductive auxiliary agent exceeds the upper limit value, not only is the conductive auxiliary agent wasted, but there is also a case where the lack of the binding force brings about the dropping of the positive electrode active material or a decrease in the capacity.

"Method for Manufacturing Positive Electrode for Lithium Ion Inorganic all-Solid-State Secondary Battery"

A method for manufacturing the positive electrode for a lithium ion inorganic all-solid-state secondary battery is not particularly limited as long as the positive electrode mixture layer can be formed on at least one main surface of the electrode current collector using the positive electrode active material of the present embodiment in the method. Examples of the method for manufacturing the positive electrode include the following method.

First, the positive electrode active material of the present embodiment, an inorganic solid electrolyte, and a solvent are mixed to prepare a positive electrode material paste. At this time, a conductive auxiliary agent such as carbon black and a binder may be added to the positive electrode material paste in the present embodiment as necessary.

"Solvent"

The solvent that is used in the positive electrode material paste containing the positive electrode active material of the present embodiment is appropriately selected depending on the properties of the binder. Appropriate selection of the solvent makes it possible to facilitate the application of the positive electrode material paste to an object to be coated such as the electrode current collector.

Examples of the solvent include water, alcohols, esters, ethers, ketones, amides, glycols and the like.

These solvents may be used singly or two or more solvents may be mixed and used.

The content of the solvent in the positive electrode material paste is preferably as small as possible from the viewpoint of the price, but may be appropriately determined in consideration of the positive electrode formability and the coatability.

A method for mixing the positive electrode active material of the present embodiment, the inorganic solid electrolyte, the solvent, if necessary, the conductive auxiliary agent, and the binder is not particularly limited as long as these components can be uniformly mixed by the method. Examples thereof include a mixing method in which the components are mixed using a kneader such as a ball mill, a sand mill, a planetary mixer, a paint shaker, or a homogenizer.

The positive electrode material paste is applied to at least one main surface of the electrode current collector to form a coating, and then the coating is dried, thereby obtaining an electrode current collector having the coating made of the mixture of the positive electrode material and the binder formed on at least one main surface. After that, the coating may be pressurized and pressure-bonded.

"Negative Electrode Containing Lithium"

Examples of the negative electrode containing lithium include negative electrodes containing a negative electrode material such as metallic Li, an Li alloy, $Li_4Ti_5O_{12}$, or a Si-based material ($Li_{4.4}Si$).

The high-temperature operation type lithium ion inorganic all-solid-state secondary battery of the present embodiment includes a positive electrode containing the positive electrode active material of the present embodiment as the positive electrode and is thus excellent in terms of the battery capacity. An operating temperature of the high-temperature operation type lithium ion inorganic all-solid-state secondary battery may be 40° C. or higher and 300° C. or lower. The operating temperature thereof can be optionally selected in the range of 40° C. to 300° C., and may be 45° C. or higher and 280° C. or lower, 50° C. or higher and 250° C. or lower, 60° C. or higher and 200° C. or lower, 70° C. or higher and 150° C. or lower, or 80° C. or higher and 130° C. or lower. The recitation of "the high-temperature operation type" may mean that the secondary battery can be suitably and effectively operated (charging/discharging) and/or stored under such a high temperature environment.

EXAMPLES

Hereinafter, the present invention will be more specifically described with examples and comparative examples, but the present invention is not limited to the following examples.

Example 1

"Production of Oxide Particles"

Ammonia water (28%) was added dropwise to a 1 mol/L iron (II) sulfate aqueous solution to adjust the pH to 9. The obtained precipitate was washed with water, dried, and then calcinated in the air at 500° C. for 2 hours, thereby obtaining a sample (powder). The obtained sample was pulverized using a ball mill to produce an electrode active material. It was confirmed by XRD measurement that the obtained powder was iron (III) oxide ($Fe_2O_3$) having a hematite structure. As the particle diameters, D10 was 0.2 µm, D50 was 1.2 µm and D90 was 4.3 µm. D10 is the particle size when the cumulative volume percentage of the particle size distribution of $Fe_2O_3$ is 10%, D50 is the particle size when the cumulative volume percentage of the particle size distribution of $Fe_2O_3$ is 50%, and D90 is the particle size when the cumulative volume percentage of the particle size distribution of $Fe_2O_3$ is 90%.

"Production of High-Temperature Operation Type Lithium-Ion Polymer Secondary Battery"

The above-described iron (III) oxide ($Fe_2O_3$), polyethylene oxide (PEO20000, average molecular weight: 20000 g/mol) as an ion conductive polymer (base material), LiTFSI as a lithium salt, and acetylene black (AB) as a conductive auxiliary agent were mixed with N-methyl-2-pyrrolidinone (NMP), which is a solvent, such that the mass ratio in a paste became 70:22:6:2 (iron (III) oxide ($Fe_2O_3$):PE020000: LiTFSI:AB) and, furthermore, the total solid content amount of the paste became 36% by mass and kneaded using a kneader (trade name: AWATORI RENTARO, manufactured by Thinky Corporation) for 15 minutes under conditions of revolution of 2000 rpm and rotation of 1000 rpm, thereby prepare a positive electrode material paste (for a positive electrode).

This positive electrode material paste (for a positive electrode) was applied to the surface of a 20 µm-thick aluminum foil (electrode current collector) to form a coating, the coating was dried, and a positive electrode mixture layer was formed on the surface of the aluminum foil.

After that, the positive electrode mixture layer was pressed at a linear pressure of 4 kN/100 mm, thereby producing a positive electrode of Example 1.

An ion conductive polymer film as an electrolyte, which is similar to that used in the positive electrode mixture layer, and a lithium metal as a negative electrode were disposed with respect to this positive electrode, pressure-bonded at a predetermined pressure, cut into a size of 2 $cm^2$, and used as a member for a battery.

Next, the member for a battery was disposed in a CR2032 type coin cell, thereby producing a high-temperature operation type lithium-ion polymer secondary battery of Example 1.

Example 2

"Production of Oxide Particles"

Iron (III) nitrate nonahydrate was calcinated at 650° C. for 2 hours under an air flow at a flow rate of 0.5 L/min, thereby obtaining a sample. At that time, the generated gas was passed through a scrubber in which a 10% sodium hydroxide aqueous solution was used, absorbed, and detoxified. The obtained sample was pulverized using a mortar to produce an electrode active material. It was confirmed by XRD measurement that the obtained powder was iron (III) oxide ($Fe_2O_3$) having a hematite structure.

"Production of High-Temperature Operation Type Lithium-Ion Polymer Secondary Battery"

A high-temperature operation type lithium-ion polymer secondary battery of Example 2 was produced in the same manner as in Example 1 except that $Fe_2O_3$ of Example 2 was used.

Example 3

"Production of Oxide Particles"

Manganese carbonate was calcinated at 600° C. for 2 hours in the air, thereby obtaining a sample. As a result of XRD measurement, it was confirmed that the obtained sample was trimanganese tetraoxide ($Mn_3O_4$).

"Production of High-Temperature Operation Type Lithium-Ion Polymer Secondary Battery"

A high-temperature operation type lithium-ion polymer secondary battery of Example 3 was produced in the same manner as in Example 1 except that $Mn_3O_4$ of Example 3 was used.

Example 4

"Production of Oxide Particles"

Titanium tetraisopropoxide $Ti(OCH(CH_3)_2)_4$ (20 g) was dissolved in ethanol to adjust the total amount to 100 mL, then, water (10 g) was added dropwise, and the mixture was stirred for 2 hours.

After that, a solid obtained by evaporation to dryness was calcinated at 450° C. for 1 hour in the air. The obtained sample was pulverized using a mortar to obtain a powdery sample. It was confirmed by XRD measurement that the obtained powder was anatase-type titanium oxide ($TiO_2$).

"Production of High-Temperature Operation Type Lithium-Ion Polymer Secondary Battery"

A high-temperature operation type lithium-ion polymer secondary battery of Example 4 was produced in the same manner as in Example 1 except that $TiO_2$ of Example 4 was used.

Comparative Example 1 to Comparative Example 4

[Production of Liquid Type Lithium-Ion Secondary Batteries]

Using each of the oxide particles produced in Example 1 to Example 4, a paste containing the oxide, polyvinylidene fluoride, and AB which were mixed at 90:5:5 was prepared, and then a positive electrode was produced using the paste. The aforementioned proportion of materials used for forming the paste was similar to the proportion used in a general secondary batteries including a liquid-electrolyte.

Then, a liquid type lithium-ion secondary battery was produced using the positive electrode and a $LiPF_6$ electrolyte, which consists of ethylene carbonate, ethyl methyl carbonate (ethylene carbonate/ethyl methyl carbonate=1/1) and 1 mol/L of a $LiPF_6$. The positive electrode was a porous electrode, and a part of the aforementioned non-aqueous liquid-electrolyte was included in the positive electrode. The non-aqueous liquid-electrolyte was located between the positive electrode and the negative electrode. The negative electrode used in Comparative examples was the same with that used in Examples. Regarding other conditions, liquid type lithium-ion secondary batteries of Comparative Example 1 to Comparative Example 4 were produced under the same conditions as those for the lithium-ion polymer secondary batteries.

[Evaluation of Secondary Batteries]

Constant current charging and discharging tests were performed using the secondary batteries of Example 1 to Example 4 and Comparative Example 1 to Comparative Example 4. The test temperature was set to 60° C., the measurement current was set to 0.5 mA/cm², and the cut-off voltage was set to 1 V to 4 V. The results of 10-cycle tests (capacity retentions after the 10-cycle tests) are shown in Table 1.

TABLE 1

| | Oxide particles | Electrolyte | Average particle diameter [μm] | $2^{nd}$ discharge capacity [mAh/g] | Cycle characteristics capacity retention [%] |
|---|---|---|---|---|---|
| Example 1 | $Fe_2O_3$ | Polymer electrolyte | 1.20 | 320 | 90 |
| Example 2 | $Fe_2O_3$ | Polymer electrolyte | 21.90 | 180 | 99 |
| Example 3 | $Mn_3O_4$ | Polymer electrolyte | 14.00 | 212 | 93 |
| Example 4 | $TiO_2$ | Polymer electrolyte | 4.70 | 290 | 93 |
| Comparative Example 1 | $Fe_2O_3$ | Non-aqueous electrolyte | 1.20 | 313 | — |
| Comparative Example 2 | $Fe_2O_3$ | Non-aqueous electrolyte | 21.90 | 160 | — |
| Comparative Example 3 | $Mn_3O_4$ | Non-aqueous electrolyte | 14.00 | 220 | — |
| Comparative Example 4 | $TiO_2$ | Non-aqueous electrolyte | 4.70 | 286 | — |

From the results in Table 1, it was found that, in the high-temperature operation type lithium-ion polymer secondary batteries of Example 1 to Example 4, the capacity retentions after the 10-cycle tests were 90% or more.

On the other hand, in the liquid type lithium-ion secondary batteries of Comparative Example 1 to Comparative Example 4, it was not possible to measure the capacity retentions after the 10-cycle tests. It is predicted that the non-aqueous liquid-electrolyte used in Comparative Examples was decomposed due to the high temperature, and secondary batteries were damaged.

Furthermore, it is also predicted that if the secondary batteries of Examples 1 to 4 are evaluated at room temperature, deterioration in the performance is observed, since iron oxide particles having the larger particle size do not function very well in such a temperature.

INDUSTRIAL APPLICABILITY

High-temperature operation type lithium-ion polymer secondary batteries or high-temperature operation type lithium ion inorganic all-solid-state secondary batteries for which the positive electrode active material of the present invention is used have an excellent battery capacity and are thus capable of significantly contributing to improvement in the reliability of lithium ion solid secondary batteries for mobile uses and the like.

The present invention can provide a positive electrode active material that can be used in a high-temperature operation type lithium ion solid secondary battery and is made of oxide particles containing a first transition element (excluding oxide particles containing an alkali metal). A positive electrode active material of the present invention can provide a lithium ion solid secondary battery including a negative electrode, which contains lithium, with no concern of safety attributed to the formation of dendrites. A positive electrode active material of the present invention can provide a high-temperature operation type lithium-ion polymer secondary battery and a high-temperature operation type lithium ion inorganic all-solid-state secondary battery, wherein the non-alkali metal-containing active material of the present invention is capable of operating in a non-ultrafine particle form, which eliminates a necessity of adding a large amount of a binder or a conductive auxiliary agent, when it is operated at a high temperature. A high-temperature operation type lithium-ion polymer secondary battery and a high-temperature operation type lithium ion inorganic all-solid-state secondary battery that have aforementioned excellent characteristics and include the positive electrode active material can be provided by the present invention.

The invention claimed is:

1. A high-temperature operation type lithium-ion polymer secondary battery comprising:
    a positive electrode containing a positive electrode mixture layer that is used in a high-temperature operation type lithium ion solid secondary battery,
    wherein the positive electrode mixture layer comprises oxide particles; an ion conductive polymer electrolyte or an inorganic solid electrolyte; and a conductive auxiliary agent,
    wherein the oxide particles are made of a compound represented by a general formula $M_yO_z$
    wherein M is at least one selected from the group consisting of Sc, Ti, Mn, Fe, Co, Ni, and Cu, 1≤y≤3, and 1≤z≤4, wherein y is 3 and z is 4 when M is Mn, and
    wherein an average particle diameter of the oxide particles is 14 μm to 50 μm;
    a negative electrode containing lithium; and
    an ion conductive polymer electrolyte located between the positive electrode and the negative electrode.

2. The high-temperature operation type lithium-ion polymer secondary battery according to claim 1,
    wherein the positive electrode includes
    an electrode current collector made of a metal foil, and
    a positive electrode mixture layer formed on the electrode current collector,
    wherein the oxide particles has the average particle diameter of 14 μm to 30 μm,
    the positive electrode mixture layer includes 50% by mass to 95% by mass of the oxide particles,
    5% by mass to 50% by mass of the ion conductive polymer electrolyte, and
    1% by mass to 10% by mass of the conductive auxiliary agent,
    the negative electrode is made of metallic Li, a Li alloy, or $Li_4Ti_5O_{12}$, and
    wherein the ion conductive polymer electrolyte included in the positive electrode mixture layer and the conductive polymer electrolyte located between the positive electrode and the negative electrode are at least one selected from a group consisting of polyethylene oxide, modified polyethylene oxide and polyvinylidene fluoride, which contain at least one selected from a group consisting of lithium perchlorate, lithium hexafluorophosphate and Li bis(trifluoromethanesulfonyl) imide as a Li electrolyte.

3. The high-temperature operation type lithium-ion polymer secondary battery according to claim 1,
wherein an operating temperature of the high-temperature operation type lithium ion solid secondary battery is 40° C. to 300° C.

4. A high-temperature operation type lithium ion inorganic all-solid-state secondary battery comprising:
a positive electrode containing a positive electrode mixture layer that is used in a high-temperature operation type lithium ion solid secondary battery,
wherein the positive electrode mixture layer comprises oxide particles; an ion conductive polymer electrolyte or an inorganic solid electrolyte; and a conductive auxiliary agent,
wherein the oxide particles are made of a compound represented by a general formula $M_yO_z$
wherein M is at least one selected from the group consisting of Sc, Ti, Mn, Fe, Co, Ni, and Cu, $1 \leq y \leq 3$, and $1 \leq z \leq 4$, wherein y is 3 and z is 4 when M is Mn, and
wherein an average particle diameter of the oxide particles is 14 μm to 50 μm;
a negative electrode containing lithium; and
an inorganic solid electrolyte located between the positive electrode and the negative electrode.

5. The high-temperature operation type lithium ion inorganic all-solid-state secondary battery according to claim 4,
wherein the positive electrode includes
an electrode current collector made of a metal foil, and
a positive electrode mixture layer formed on the electrode current collector
the oxide particles has the average particle diameter of 14 μm to 30 μm,
the positive electrode mixture layer includes
50% by mass to 95% by mass of the oxide particles,
5% by mass to 50% by mass of the inorganic solid electrolyte, and
1% by mass to 10% by mass of the conductive auxiliary agent,
the negative electrode is made of metallic Li, a Li alloy, or $Li_4Ti_5O_{12}$, and
wherein the inorganic solid electrolyte included in the positive electrode mixture layer and the inorganic solid electrolyte located between the positive electrode and the negative electrode are at least one selected from a group consisting of $Li_7La_3Zr_2O_{12}$ and a Li-Sn-Si-P-S-based sulfide.

6. The high-temperature operation type lithium ion inorganic all-solid-state secondary battery according to claim 4, wherein an operating temperature of the high-temperature operation type lithium ion solid secondary battery is 40° C. to 300° C.

* * * * *